Nov. 7, 1961  B. E. CULL  3,007,588
TRAILER AND TRANSFER MEANS
Filed June 27, 1960  2 Sheets-Sheet 2

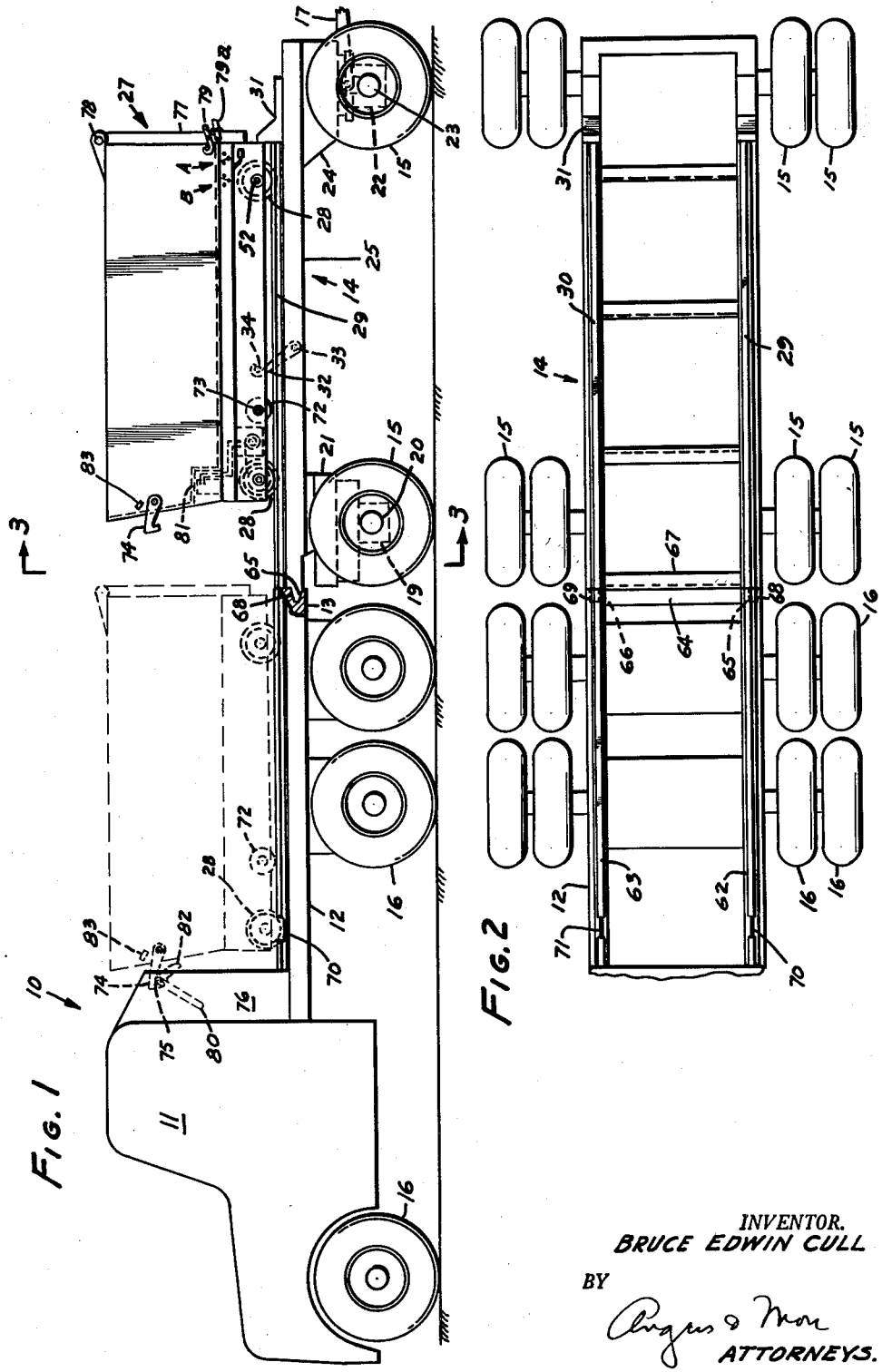

INVENTOR.
BRUCE EDWIN CULL
BY
ATTORNEYS.

United States Patent Office 3,007,588
Patented Nov. 7, 1961

3,007,588
TRAILER AND TRANSFER MEANS
Bruce Edwin Cull, Lynwood, Calif., assignor to Compton Truck & Equip. Co., Compton, Calif., a corporation of California
Filed June 27, 1960, Ser. No. 38,988
6 Claims. (Cl. 214—38)

This invention relates to freight or load transferring equipment and more particularly to equipment in which a load is transferred from one truck to another.

An object of the invention is to provide a truck and trailer arrangement in which a wheeled load on the trailer may be readily transferred to the truck. A related object is to provide a lightweight mechanism for the purpose, which requires relatively few parts.

Truck and trailer combinations are well known; and it is also well known to carry a bin on wheels which rest on a trailer which is towed by a truck. When it is desired to dump the trailer bin, the bin is rolled from the trailer onto the truck, and the truck bed is then tilted to dump the bin. In the past the usual ways of rolling the bin onto the truck have been by a chain driven from the truck motor or by a hydraulic ram arrangement operated from the power plant of the truck.

In accordance with the present invention, the bin wheels are propelled by an electric motor. These wheels roll on tracks on the trailer which can be aligned with corresponding tracks on the truck bed so that the bin can propel itself from the trailer to the truck.

A feature of the arrangement resides in the manner of attaching and coupling the electric motor to the bin wheels.

A related feature resides in means for holding the bin on the trailer and for locking the bin to the truck for the purpose of dumping.

The foregoing and other features will be better understood from the following detailed description and the accompanying drawings, of which:

FIG. 1 is a side elevation view of a dump truck and trailer and rollable bin combination in position for rolling the bin from the trailer to the truck;

FIG. 2 is a plan view of the truck and trailer arrangement of FIG. 1, but without the rollable bin;

Figure 3:
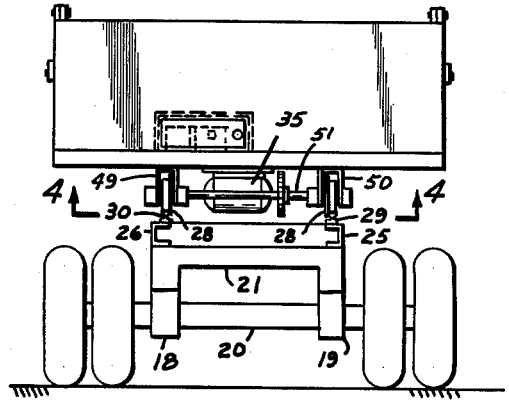
FIG. 3 is an elevation view taken at line 3—3 of FIG. 1.

Referring to the drawings, there is shown a dump truck 10 having the usual cab portion 11 at the front of the truck and a tiltable platform 12 at the rear of the truck. This platform is rotatable about a horizontal axis, at a position 13 at the rear of the truck; and a suitable pivot (not shown) is attached to the truck frame for this purpose. The platform 12 can be rotated in a clockwise direction (with reference to FIG. 1) about the horizontal axis 13 so as to tilt the forward part of the truck bed upwardly to permit dumping of the truck, in a well-known manner. Ordinarily the dumping is done by a hydraulic ram fastened to the truck frame and located beneath the forward part of the tiltable platform. When the hydraulic ram is extended it pushes the front part of the platform upwardly to produce the tilting. The details of construction of the bed pivoting and dumping mechanisms are not shown, as they are commonly known arrangements and are no part of the present invention.

The truck is adapted to tow a trailer 14 mounted on wheels 15 which can be about the same size as the usual wheels 16 of the truck. For the purpose of towing, the trailer is provided with a tow bar 17 of which a portion is shown in FIG. 1. This tow bar is ordinarily several feet, for example about eight to twelve feet long, and for purpose of pulling the trailer the front of the tow bar is attached at a suitable attachment at the rear of the towing truck 10. In FIG. 1 the tow bar is shown extending rearwardly relative to the dump truck 10. The reason for this is that the dump truck, after towing the trailer, has been disengaged from the tow bar and the dump truck has been moved around to the rear of the trailer; and in FIG. 1 the dump truck is shown with its rear end attached to the rear end of the trailer.

The trailer bed is mounted on the front and rear axles of the wheels 15. The rear mounting comprises blocks 18 and 19 mounted on rear axle 20 and a crossbeam 21 is fastened to the tops of blocks 18 and 19. Similarly, the front mounting comprises block 22 and another similar block (not shown) on the other side of the trailer mounted on front axle 23 and with a crossbeam 24 fastened to the top of these last-mentioned two blocks. A pair of channel beams 25 and 26, forming part of the trailer bed, extend parallel to each other in a fore-and-aft direction from the rear beam 21 to the forward beam 24.

A bin 27 having a bottom and four sides, but normally open at the top, is mounted on flanged wheels 28 which roll on tracks 29 and 30, fastened to the upper side of respective channel beams 25 and 26. To keep the rollable bin from rolling off the trailer, the forward end of the trailer is provided with a stop 31 against which the lower part of the end of the bin which is at the forward end of the trailer, is adapted to rest; and in this position a pivoted hook 32 pivoted on a pivot pin 33 attached to the bed of the trailer, can hook over a pin 34 fastened in the frame of the bin. In this way, the bin can roll neither forwardly nor rearwardly.

A D.C. electric motor 35, operated by two 12-volt storage batteries 59 and 60 located in a battery compartment 81, is mounted beneath the floor of the bin. This motor is provided with a shaft 36 having fastened to it a coupling plate 37 which is attached to a similar coupling plate 38 attached to a shaft 39 mounted to rotate in bearings 40 and 41 which are also fastened beneath the bottom of the bin floor. Shaft 39 has fastened to it a sprocket wheel 42 which is engaged by an endless chain 43 which engages a sprocket wheel 44 on axle 51. Thus, rotation of the motor rotates the axle and hence the wheels 28 when the clutch is engaged. The axle shaft 51 is journaled in bearings 45, 46, 47, and 48 attached to channel beams 49 and 50, the bases of which pass along lengthwise beneath the floor of the bin; and the sides of which depend parallel to each other. A pair of the bearings 45 and 46 is attached to the respective sides of channel beam 49 and the other pair 47 and 48 of the bearings is attached to the respective sides of channel beam 50. Corresponding holes are formed through the channel members at the positions of the bearings so that the axle 51 can pass through. The wheels 28, fastened to the axle, are located between the sides of the respective channel beams.

At the end of the bin which is at the forward end of the trailer, the wheels 28 are mounted on an axle 52 which passes through bearings attached to the channel beams 49 and 50 in a manner similar to the arrangement of axle 51. The flanges 53 of the wheels 28 are at the inside sides of the wheels and engage the inside edges of tracks 29 and 30, thereby serving to keep the wheels on these tracks.

For the purpose of reversing the direction of rotation of the motor there is provided means for reversing the connections of the brushes of the motor at the motor commutator. The particular arrangement of the brushes at the commutator is a common expedient and no part of the present invention. To make the motor reversible, for example, there may be provided two pairs of brushes for the motor commutator 84 as shown in FIG. 4a, one pair 85 and 86 being for rotation in one direction and the other pair 87 and 88 for rotation in the opposite direction. The battery voltage is carried over lead 54 through throw-out switch D, which can be closed to transmit the voltage to the motor; and to the arm of a switch A which can be thrown to either of contacts 55 or 55a. When thrown to contact 55, the battery voltage is applied to the opposite brushes 87 and 88, but not to the other opposite brushes 85 or 86, and when thrown to contact 55a the battery voltage is applied to opposite brushes 85 and 86 but not to brushes 87 and 88. The pair of brushes 85 and 86 is located in quadrature to the brushes 87 and 88, so that the direction of rotation depends on which of the contacts 55 and 55a the switch A is thrown to. Both switches A and B are preferably placed at the side of the bin as shown.

Figure 4:
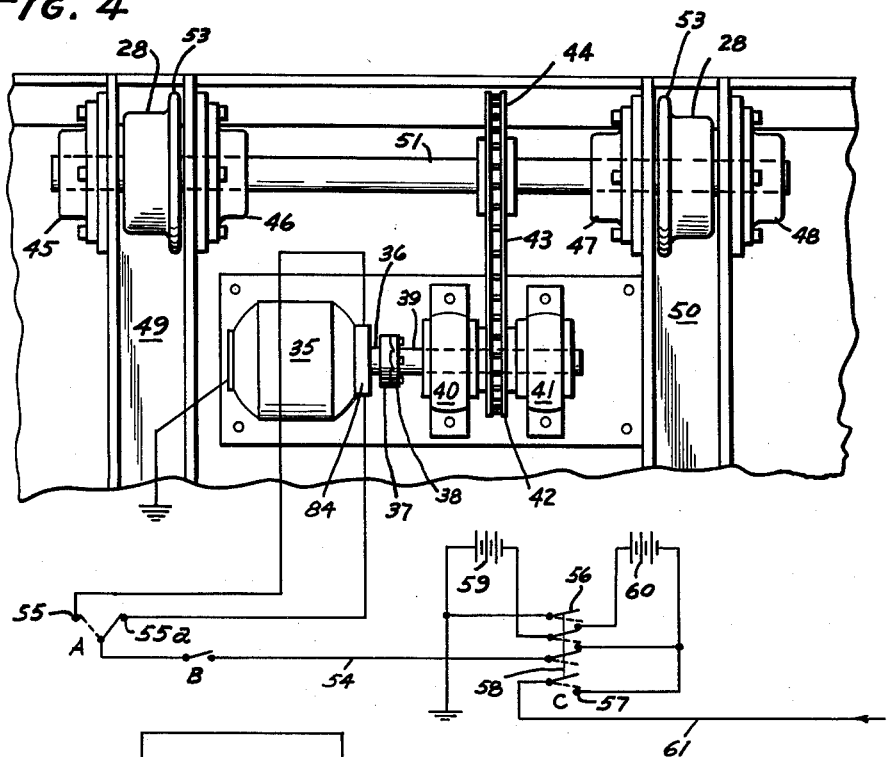
FIG. 4 is a partial view from the under side of the rollable bin, taken at line 4—4 of FIG. 3, and showing also the electrical circuit connections.
Figure 4A:
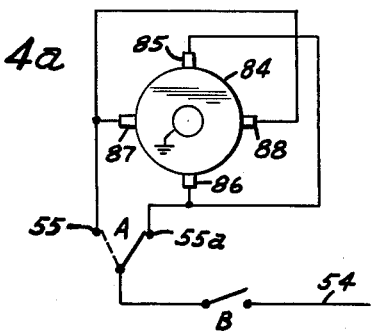
FIG. 4a is a wiring diagram showing connections to the brushes of the motor which drives the bin.

It will be recognized that the circuitry of FIGS. 4 and 4a is a simple type and that there are other ways of operating and reversing the motor which may readily suggest themselves. The motor will, of course, draw a heavy current from the battery and this may cause considerable arcing at the switch contact points in the use of ordinary switches. The use of such heavy currents at the switches may be avoided, of course, by well known means such as the use of relays which do not require much current so that the making and breaking of the heavy motor current will be done at relay contacts. Such expedients are not shown herein as they are no part of the present invention.

A third switch C is also provided for the purpose of switching the battery connections from a series connection to a parallel connection and vice versa. Thus, the switch C comprises four switch arms 56 which can make contact with three contacts 57. These switch arms are operated in unison as shown by the bar 58. When the bar 58 moves the arms upwardly, the middle pair of switch arms is in contact with the uppermost pair of contacts 57 which has the effect of connecting the two batteries 59 and 60 in series so that 24 volts can be applied to the motor. When the switch bar 58 is moved downwardly, to move all the arms downward, the contacts move to their dotted line positions which has the effect of connecting the two uppermost arms 56 to the respective two uppermost contacts 57, and of connecting the lowermost arm 56 to the lowermost arm 57. This has the effect of placing the two batteries 59 and 60 in parallel and of disconnecting the battery from the main throw-out switch B. In this latter connection, the lead 61 from the usual battery charger in the truck is connected to the lowermost switch arm 56, which will have the effect of charging both batteries since once side of such a battery charger is grounded, while one side of the batteries are also grounded.

The truck bed is provided with a pair of tracks 62 and 63 similar to the tracks 29 and 30 of the trailer, and similarly spaced apart; and the truck bed and trailer bed should be at the same elevation above the ground so that the tracks of the truck and trailer can be aligned. For the purpose of effecting such alignment of the tracks, the rear frame member 64 of the truck is provided with a pair of recesses 65 and 66 at either side thereof; and the corresponding rear member 67 of the trailer is provided with mating protuberances 68 and 69, respectively, which are spaced to fit into the respective recesses 65 and 66 when the truck is backed to the rear of the trailer as shown in FIGS. 1 and 2. A locking or latching arrangement (not shown) is preferably provided to secure the truck and trailer together when they are in this position of FIGS. 1 and 2.

The bin 27 can now be rolled from the trailer to the truck along the aligned tracks to its dotted position shown in FIG. 1. When the bin has been rolled all the way on the truck, its wheels 28 at the end nearest the cab drop into cut-outs 70 and 71 of tracks 62 and 63 respectively. These cut-outs in the tracks are made just large enough so that the wheels 28 will drop part way down into them, as shown in FIG. 1, and the downward drop of the wheels 28 will be arrested when a pair of idler wheels 72 mounted on the undercarriage of the bin rest on the tracks to take the weight of this end of the bin; and these wheels 28 will then be freed to rotate independently of the tracks. These idler wheels 72 will have the same spacing apart as the main wheels 28 and can be about the same diameter as the wheels 28; and they should be near the same end of the bin as the wheels 28 which drop down into the track cut-outs. The axles 73 of the wheels 72 are set somewhat higher than the axles of the wheels 28 so that when wheels 28 are all rolling on the tracks, the wheels 72 will be located somewhat above the tracks, and the dropping of the wheels 28 into the cut-outs will be sufficient to enable the wheels 72 to rest on the tracks and take up the weight of the bin.

In this position of the bin on the truck, shown in phantom in FIG. 1, a latch 74 on the end of the bin nearest the cab of the truck will latch onto a shaft 75 rotatable in the truck frame 76 at the back of the cab. This arrangement will serve to hold the bin on the truck when the truck bed is tilted (in a clockwise direction in reference to FIG. 1) to dump the contents of the bin.

For the purpose of dumping the contents of the bin by this tilting, the bin is provided with a suitable tailboard 77 which pivots at 78 at its upper end so that it can swing counterclockwise on this pivot (with reference to FIG. 1). A suitable latch 79 near the bottom latches the tailboard to the walls of the bin to maintain the bin closed until it is opened by actuation of the unlatching lever 79a, which will allow the tailboard to swing counterclockwise as the truck bed is tilted to dump the bin contents.

When it is desired to roll the bin from the truck back onto the trailer, the truck bed will first be returned to its normal horizontal position and then the truck will be rolled back again to become aligned with the trailer as shown in FIGS. 1 and 2. Following this, a handle 80 fastened to the end of shaft 75 can be turned counterclockwise with reference to FIG. 1 to rotate shaft 75 and cause the lever 82 fixed to the shaft to raise the latch 74 to release it from the shaft and raise the latch until it abuts a stop 83 fastened to the bin. Further movement of handle 80 in the same direction will thereby lift the end of the bin by lifting the latch against the stop and also move the bin rearwardly on the truck to move the wheels out of the cut-outs 70 and 71 and back on the tracks. A latch means 74 and stop 83 and a lever 82 may be placed at both sides of the bin, instead of only one side to facilitate this operation. The bin can now be rolled back off the truck and onto the trailer to the position shown in full lines in FIG. 1.

The operation of the arrangement will be apparent from the foregoing description. To summarize, the bin with its tail gate closed and latched, will be loaded on the trailer in its position shown in full lines in FIG. 1. The rear of the truck will then be connected with the towing bar 17 at the front end of the trailer and convey the trailer to its destination. It will be understood that at the same time, the truck itself will usually also carry a load of its own to its destination. At the destination, the truck will be uncoupled from the towing bar 17 and the truck will then move to dump or deliver its own load, if any. The truck will then back up to the rear end of the trailer to the position shown in FIGS. 1 and 2, so that the tracks of the truck and trailer are aligned as shown.

During the travel of the truck and trailer, the series-parallel switch member 58 will be at its parallel battery position so that the battery charger on the truck can charge the batteries 59 and 60. But at the region of dumping the conveyed material, the switch member 58 will be operated to place the two batteries in series and off the charger, and the operator will close the main switch B and then operate switch A to its position which will drive the motor 35 in the direction to drive the bin from the trailer onto the truck as shown in phantom. When the truck has rolled several feet, either switch A or B can be opened to take the power off the motor so that the truck will simply coast to its position where its wheels 28 drop into the recesses 70 and 71; at which point the latch 74 will be latched. After the tilting of the truck bed and dumping of the contents of the bin as explained above, the lever 75 will be operated to unlatch the latch 74 and raise the wheels 28 back on the track, and the switch A will be reversed while switch B is closed to run the motor 35 in the opposite direction, which will have the effect of rolling the bin back onto the trailer. After the rolling has gone for a few feet, the power will then be shut off the motor and the bin will coast until it reaches the abutment 31, at which point it will be locked in position by latch member 32 on knobs 34.

The mechanism of my present invention has many advantages over previously known truck and trailer mechanisms. The electric motor powered rolling bin possesses advantages over previously known types of rolling bins which have utilized powered chains for propelling the bin on and off the truck. In the use of such chain drives there was frequently experienced breakage of chains due to shocks in the stopping and starting of the bin, but with the present motor drive, the driven wheels of the bin can slip on the tracks when subjected to shock loads, and the slippage can take up the shock; moreover the bin wheels driven by the motor can freely rotate after dropping into the track recesses.

A related advantage of the present arrangement is that strains are not imposed on the truck due to any bin driving mechanism; and furthermore, it is not required that the alignment of the truck and trailer be as perfect as in the case of prior known mechanisms.

One of the prior known types of truck and trailer mechanisms utilized hydraulic power connections to the truck motor for the purpose of powering the rolling bin. The use of such hydraulic equipment took time for the required hydraulic hook-up and there were also involved problems of leakage in such hydraulic systems. By the use of the present arrangement in which no hydraulic drive systems are used these disadvantages of the hydraulic systems are avoided.

The present arrangement involves fewer parts and less expense than either the chain drive type of equipment or the hydraulic drive type. Owing to the use of the battery drive in the present mechanism, no hoisting of the truck is required to roll out the bin.

It will be recongized that the present simple motor and battery operated mechanism avoids the possibility of damage to the power take-off equipment which had to be used in the prior known systems wherein the power for propelling the bin was taken from the motor of the truck. By reason of this simplicity, less complicated construction of truck and trailer frames is required than in cases where chain drives are used to propel the trailer which require a central area for the chain.

The invention is not limited to the particular embodiment illustrated and described, which is given by way of illustration rather than of limitation and the invention is not limited except in accordance with the scope of the appended claims.

What is claimed is:

1. In combination, a truck, a trailer adapted to be towed by the truck, a track means on the truck and a similar track means on the trailer, means for aligning and joining the rear of the truck with an end of the trailer so that the respective tracks on the trailer and truck become aligned with each other, and a bin rollable on wheels and adapted to be carried on the tracks of the trailer and to be rolled onto the tracks of the truck and back into the tracks of the trailer, said bin comprising a battery-powered electric motor in driving relationship with wheels of the bin, recess means in the tracks on the truck whereby wheels of the bin drop into the recess means when the bin is rolled onto the truck, auxiliary idler wheels mounted on the truck and having their lowermost peripheral positions above the lowermost peripheries of the wheels which drop into the recesses, said idler wheels resting on the tracks of the truck to take the weight of the bin when said wheels drop into the recesses.

2. Apparatus according to claim 1 in which the wheels which are in the recesses are free to rotate relative to the track.

3. Apparatus according to claim 1 in which the bin is provided with a latch means for latching it to the truck so that the bin will not roll off the truck when the truck bed is tilted.

4. Apparatus according to claim 3 in which lever means is attached to the truck for lifting the bin to raise the wheels out of the track recesses and onto the tracks.

5. Apparatus according to claim 1 in which said electric motor is reversible to propel the bin in either direction.

6. Apparatus according to claim 1 in which the battery for said battery powered motor comprises two 12-volt batteries, and switching means for connecting said batteries in series for driving the motor and alternatively for connecting said batteries in parallel for charging from a battery charger.

References Cited in the file of this patent

UNITED STATES PATENTS

| | | |
|---|---|---|
| 1,797,601 | Barr | Mar. 24, 1931 |
| 1,921,605 | Canfield | Aug. 8, 1933 |
| 2,849,129 | Likens | Aug. 26, 1958 |